United States Patent

Camp et al.

[11] B 3,922,645
[45] Nov. 25, 1975

[54] DATA HANDLING SYSTEM WITH ROTATABLE FIBER OPTIC SHUTTER

[75] Inventors: Harold E. Camp, Toledo, Ohio; John D. Grier, Bridgeton, N.J.

[73] Assignee: Owens-Illinois, Inc., Toledo, Ohio

[22] Filed: Mar. 12, 1973

[21] Appl. No.: 340,212

[44] Published under the Trial Voluntary Protest Program on January 28, 1975 as document no. B 340,212.

Related U.S. Application Data

[62] Division of Ser. No. 574, Jan. 5, 1970, Pat. No. 3,749,487.

[52] U.S. Cl. .... 340/173 PL; 250/236; 315/169 TV; 340/173 LT; 350/96 B; 350/160 R
[51] Int. Cl.² .............. G11C 11/28; H01L 31/14; H05B 41/00
[58] Field of Search .......... 350/96 B, 160 R; 340/173 PL, 173 LT; 315/169 TV; 250/236

[56] References Cited
UNITED STATES PATENTS

| | | |
|---|---|---|
| 3,233,515 | 2/1966 | Platzer et al. .................. 350/267 |
| 3,447,138 | 5/1969 | Carson et al. ................ 340/173 CC |
| 3,723,977 | 3/1973 | Schaufele .................... 340/173 PL |
| 3,731,225 | 5/1973 | Wild et al. ..................... 350/96 B |
| 3,737,367 | 6/1973 | Roberts et al. ................. 350/96 B |
| 3,752,994 | 8/1973 | Grier et al. .................... 350/96 B |

FOREIGN PATENTS OR APPLICATIONS

| | | | |
|---|---|---|---|
| 1,946,693 | 8/1970 | Germany .................... 350/96 B |

*Primary Examiner*—Stuart N. Hecker
*Attorney, Agent, or Firm*—Donald Keith Wedding

[57] ABSTRACT

A visual data handling system incorporating a visual display device to provide an illuminated display of data. A print-through device utilizing a matrix of light conducting elements transfers the illuminated display of data to a light responsive type printer. This illumination transfer can be selectively interrupted by a turn-off mechanism, which does this by maneuvering the print-through device. Also, the light conducting elements can incorporate lasing devices to intensify the illumination.

8 Claims, 8 Drawing Figures

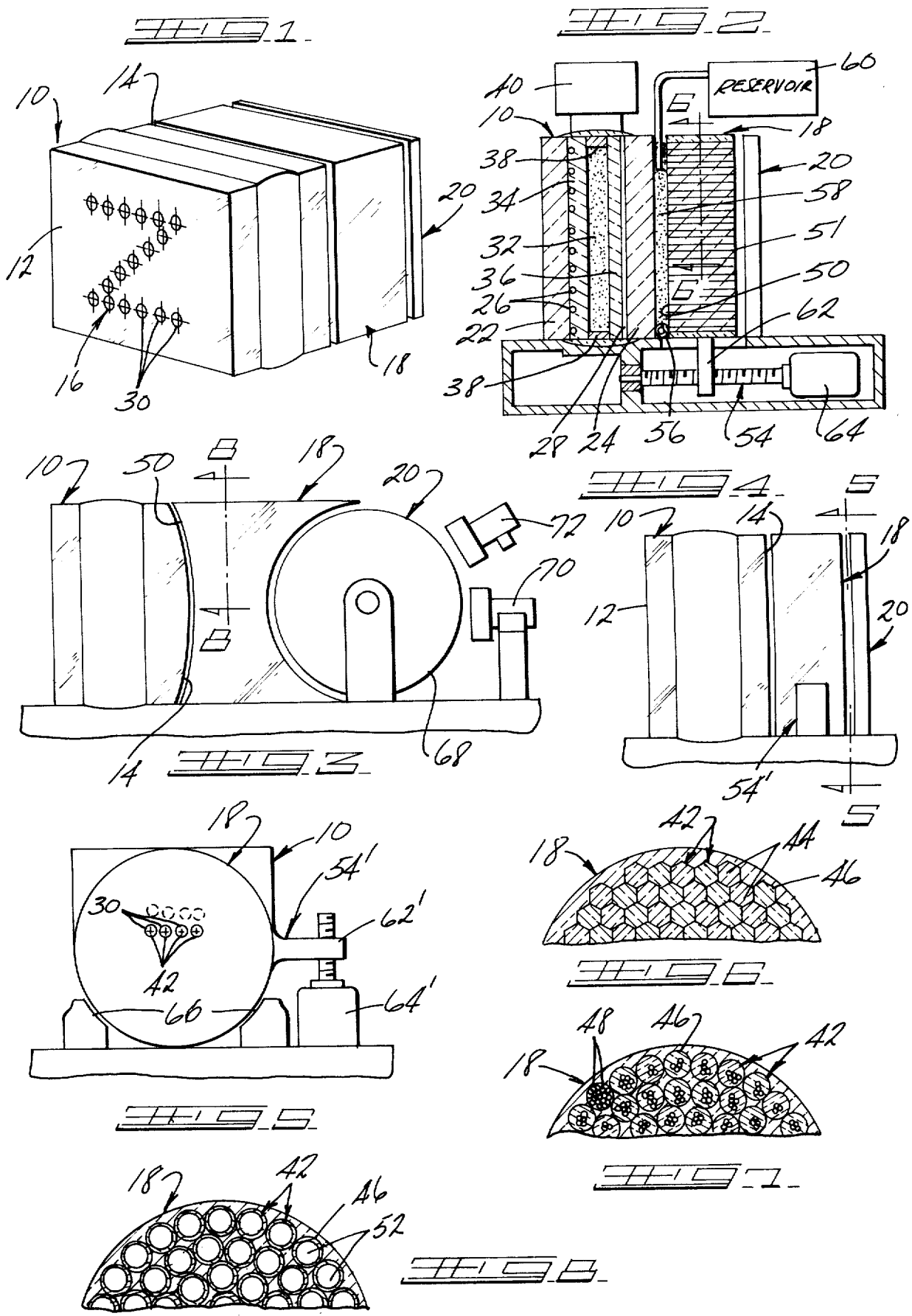

DATA HANDLING SYSTEM WITH ROTATABLE FIBER OPTIC SHUTTER

RELATED APPLICATION

This is a division of copending United States patent application Ser. No. 574, filed Jan. 5, 1970, now U.S. Pat. No. 3,749,487.

This invention relates to improvements in visual data handling systems.

Frequently, it is desired to preserve a visual display of information, such as data displayed on the viewing face of a gas discharge panel. If the printer is to be located remotely of the panel or cannot be placed in contact with the panel because the contours of the panel and the printer are incompatible, then a print-through provision is required. There can, however, be a substantial loss in illumination if the light transfer distances are great or if the print-through device cannot be placed close enough to the panel. Then too, focal lengths must be considered if effective light transfer is to be achieved. Light turn-off is too a problem, particularly when it is preferred not to turn-off the visual display, but still interrupt the transfer of the display to the printer.

With the foregoing in mind, a new and different data handling system is contemplated wherein visual information is transferred to a printer by a print-through device incorporating a series of light conducting elements and wherein the print-through device can be turned off.

Also contemplated is a visual data handling system utilizing, in an unusual way, lasers to achieve light intensification.

Other objectives include provision of a print-through device that employs a matrix of light conducting elements formed as a unitary structure; that is adaptable for using fiber optic elements; that is easily maneuverable to effect interruption of the illumination transfer; that facilitates contact print-out from a visual display regardless of the contour of the display's print-out face; that is easily adaptable for use with many diverse types of printers; that can provide variable focal lengths; and that can afford light intensification for improved print-out.

The foregoing and other objects and advantages of the invention will become apparent from the following description and from the accompanying drawings in which:

FIG. 1 is a perspective view of a visual data handling system incorporating the principles of the invention;

FIG. 2 is a cross-sectional view, partially schematic, of an embodiment of a visual data handling system similar to that shown in FIG. 1;

FIG. 3 is a side elevational view, partially schematic, of another embodiment of the visual data handling system and is similar to the FIG. 2 system but adapted for a drum type printer;

FIG. 4 is a side elevational view of still another embodiment of the visual data handling system;

FIG. 5 is a view of the FIG. 4 system looking in the direction of arrows 5—5 in FIG. 4;

FIGS. 6, 7 and 8 are cross-sectional views depicting variations in the structures of print-through devices for the visual data handling system.

Referring to FIG. 1, the visual data handling system includes a visual display device, which can be of any well known type, such as a gas discharge panel shown generally at 10. The panel 10 provides both visual display and data storage functions and has a viewing face 12 and an opposite print-out face 14. Operationally, the panel 10 is capable of providing at its viewing face 12 an illuminated pattern 16 of information, such as numerals, words, letters, pictures, etc. The pattern 16 illustrated is the letter "Z." This same information appears at the print-out face 14 and is transferred by a print-through device, designed generally at 18, for print-out by a printer, denoted by the numeral 20, of a type that achieves print-out by being receptive to light. Thus, the illuminated pattern 16 is transferred by the print-through device 18 to the printer 20 where a record is made of this pattern 16.

The details of the gas discharge panel 10 are shown and described in the U.S. Pat. No. 3,499,167 to Baker, et al. Therefore, for purposes of understanding the invention only a brief explanation is made. Referring to FIG. 2, the gas discharge panel 10 includes spaced apart support members or plates 22 and 24 formed of a polished commercially available soda lime plate glass so as to be optically transparent.

The support plates 22 and 24 have thereon conductor arrays 26 and 28 respectively. These conductor arrays 26 and 28 are at right angles to each other but they may have any other appropriate transverse relative orientation so as to provide at the intersection a series of cross-points 30 as viewed in FIG. 1. If wanted a conductor array could be in the form of a conductive coating covering the entire face of one or both of the support plates 22 and 24. The arrays 26 and 28 are made from a material that is a good conductor, such as copper, gold, silver or aluminum. If optical transparency is required, then tin-oxide, gold or aluminum could be used.

The conductor arrays 26 and 28 are spaced from a gas discharge chamber 32 by dielectric members 34 and 36. These dielectric members 34 and 36 can be in the form of a film or coating which is optically transparent, such as a low melting glass material. Spacers 38 of a similar material separate the dielectric members 34 and 36 and establish the desired gap spacing.

The chamber 32 contains, at the proper operating pressure, a gaseous mixture capable of being discharged upon application of a firing potential to selected conductors of the arrays 26 and 28. The gas mixture may consist of a neon gas as a major constituent and small effective amount of at least one minor constituent selected from argon, krypton or xenon, in an amount to provide a Penning mixture.

An appropriate driving and addressing circuit 40 is connected to the conductor arrays 26 and 28. Exemplary of a circuit for this purpose is that shown and described in U.S. application Ser. No. 699,170 to Johnson et al., filed Jan. 19, 1968 now U.S. Pat. No. 3,618,071.

The panel 10 operates according to the principle that an electric breakdown of a gas, containing one or more free charge carriers, particularly electrons, occurs when a sufficient electric field is applied to the gas. Therefore, when the driving and addressing circuit 40 is rendered operative, it will supply an operating voltage, which will include a write-in voltage pulse, representing the information to be entered, and a sustaining voltage. Assuming that this operating potential is increasing during its positive half-cycle, there will be a correspondingly increasing electric field applied across the chamber 32 at the selected crosspoints 30. This electric field will accelerate any free electrons and ions present to initiate collisions with the gas molecules and with the dielectric member surfaces. This activity creates additional electrons and ions which are accelerated by the electric field and ultimately there is an electron avalanche resulting in an electric breakdown of the gas or a gas discharge.

The visual glow from these gas discharges results from the electron-ion recombination and the return of the excited gas molecules to the ground state accompanied by the emission of photons of light. These gas discharges portray the information that is to be written-in by the driving and addressing circuit 40.

In FIG. 1 only those cross-points 30 forming the letter Z will have the write-in voltage pulse supplied to the corresponding conductors of the arrays 26 and 28 to provide the gas discharges and the illumination for outlining the letter Z. During each halfcycle of the operating potential the gas discharges extinguish but now charges have accumulated on the surfaces of the dielectric members 34 and 36 and are available for facilitating the discharge during the next half-cycle. These accumulated charges and the electric field assistance they provide enable the next discharge to be initiated with a lower applied potential. The write-in voltage, therefore, can be removed and the written-in information will continue to be displayed with just the sustaining voltage alone. Hence, the panel 10 has a memory capability which is very useful for data storage purposes.

As mentioned the print-through device 18 functions to transfer the illumination from the print-out face 14 of the panel 10 to the printer 20. The print-through device 18 can be of many different cross-sectional shapes; e.g., the same shape as the panel 10 illustrated in FIG. 1 or annular as shown in FIG. 5. Referring now to FIGS. 6 and 7 the print-through device 18 is formed with a matrix of light conducting elements, each assigned the numeral 42. These light conducting elements 42 can be of different cross-sectional shapes, such as the hexagonal shape seen in FIG. 6 or the round shape portrayed in FIG. 7. The light conducting elements 42 are preferably imbedded in glass to provide a unitary construction and are each aligned with one of the cross-points 30. If cross illumination at the ends of the elements 42 is a concern, a glass can be selected that is an inefficient light conductor or incapable of conducting light. In FIG. 6 each light conducting element 42 is shown with a solid core 44, which can be made of glass or plastic, and has a jacket 46 of an appropriate non-light conducting material; e.g., DuPont's Alathon polythylene resin to prevent cross-illumination between the adjacent light conducting elements 42. If preferred fiber strands 48 can be employed, as illustrated in FIG. 7. These fiber strands 48, commonly referred to as, fiber optics can be any commercially available type; for instance, Crofon light guides made by the DuPont Co. Each of the fiber strands 48 can be made of Lucite polymethyl methacrylate and sheathed with a polymer of lower refractive index. The fiber strands 48 are bundled together in multiples of 16, 32, 48 or 64 within the jacket 46. To reproduce the pattern 14, the fiber strands 48 are coherently bundled, i.e., the fiber strands 48 are in the same relative position at both ends of the matrix.

The print-through device 18 can have its input face 50 or its output face 51 or both shaped to conform to the respective surfaces of the panel 10 and the printer 20, e.g., as shown in FIG. 3. Also the input face 50 can be in physical contact with the print-out face 14 of the panel 10 and the output face 51 in contact with the printer 20. This latter contact will be determined by the printer's construction and type. Of course, focal lengths will have to be properly selected for optimum light transfer.

To increase the light intensification, the FIG. 8 construction can be utilized. In this construction the light conducting elements 42 each have within the core 44 a laser or lasing device 52 formed of a semiconductor material, e.g., neodymium glass. The lasing device 52 can be of conventional construction with the ends mirror coated except that the output end; i.e., the end adjacent printer 20 has a lighter mirror coating. The space between the jacket 46 and the sides of the lasing device 52 is either filled with glass, plastic or fiber optic elements 48 to supply illumination to the side of the lasing device 52 to create the pumping action. The input ends of the light conducting elements 42, except for the lasing devices 52, should be blocked or treated so as to not transfer any illumination. Also, if fiber optic elements 48 are used they can be randomly arranged. Because, for the reasons mentioned, the illumination from the panel 10 will be pulsating, the atoms within the lasing device 52, which are at ground state, will be excited to higher energy levels by absorbtion of the pulsating optical energy supplied thereto along the sides of the lasing device 52 from the panel 10. When these excited atoms return to their ground state, there will be an emission of photons of energy. When this emission is parallel to the length of the lasing device 52, a collision occurs with another atom and it is stimulated to emit a photon of energy exactly in phase and travelling in the same direction as the bombarding photon. This action in developing coherent photons will be repeated many times to develop additional coherent photons, which will be reflected back and forth between the mirrored ends of the lasing device 52. This chain reaction will continue until there is a substantial build-up of in-phase optical energy within the lasing device 52. When sufficient photon energy has been developed it will burst through the lighter mirrored end of the lasing device 52 in the form of a useful laser beam and will be supplied to the printer 20. Thus, the lasing device 52 in the FIG. 8 embodiment converts light energy from the panel 10 to short duration high energy light bursts or pulses. The process is continuously repeated to develop subsequent pulses of laser energy. These pulses of laser energy enable illumination to be transferred over longer distances and also, if a concern, will reduce exposure time since these high energy pulses have a short duration.

To enable the transfer of illumination by the print-through device 18 to be interrupted without deenergizing the panel 10, a turn-off mechanism denoted generally by the numeral 54 is provided. As illustrated in FIG. 2, the turn-off mechanism 54 includes a sealing member such as a hollow rubber ring 56, which is interposed between the panel 10 and the print-through device 18. The ring 56 extends around the exterior of the print-out device 18 between its input face 50 and the exterior of the panels print-out face 16 so as to not interfere with the transfer of illumination therebetween. The ring 56 defines a gap space 58 which has fluid tight communication with a reservoir 60 containing a light absorbing fluid, this fluid can be water, heptane, or the like. When, for example, the print-out device 18 is moved towards the panel 10, fluid within the gap space 58 will be returned to the reservoir 60 due to the increase in the pressure in the gap space 58. Therefore, the transfer of illumination is permitted since the light absorbing fluid will be removed from the gap space 58 and returned to the reservoir 60. When the print-through device 18 is retracted or moved to increase the gap space 58, the difference in pressure will cause the fluid to flow from the reservoir 60 into the gap space 58 and prevent the transfer of illumination between the panel 10 and the print-through device 18.

Under some circumstances, the efficiency of the light absorbing fluid may not be necessary. For instance, the focal lengths of the light conducting elements 42 may be such that when the print-through device 18 is in the non light-transferring position, light transfer is inadequate for printing.

Either the panel 10 or the print-through device 18 can be moved in many different ways as those versed in the art will appreciate. In FIG. 2 the print through device 18 is moved by ball and screw mechanism 62 of well known construction. This mechanism 62 is driven by a reversible motor 64 of any appropriate construction and may be electrically or hydraulically operated.

In FIGS. 4 and 5, a different type of turn-off mechanism denoted by the numeral 54' is illustrated. This turn-off mechanism 54' has spaced guideways 66 which support the print-through device 18 for rotational movement. This rotational movement can be, as with the turn-off mechanism 54, by a ball and screw mechanism 62' and a reversible motor 64'. Keeping in mind that each of the light conducting elements 42 is aligned with one of the cross-points 30, when light transfer interruption is wanted, then by rotating the print-through device 18 slightly, misalignment occurs and light transfer stops. This misalignment shows in FIG. 5 some of the light conducting elements 42 in their solid line position, aligned with the cross-points 30. Slight angular rotation of the print-through device 18 moves these light conducting elements 42 to the broken line position so as to be displaced from and out of alignment with the cross-points 30, thus, interrupting the light transfer. As will be appreciated the spacing of the light conducting elements 42 will have to be selected so that upon slight angular movement of the print-through device 18 none of the light conducting elements 42 is aligned with one of the cross-points 30 but aligned with the area of the print-through device 18 between the light conducting elements 42. This area, if glass, should not conduct light either by being opaque or of a focal length such that the light transferred is inadequate for print-out purposes.

By slight modification of the guideways 66, as will be readily apparent to those skilled in the art, the rotational movement of the print-through device 18 can be converted to a combination of rotary and rectilinear motion, or any other kind of single plane movement if wanted and required to interrupt the light transfer. Also be providing the guideways 66 with arcuate tracks multiplane movement can be achieved.

The printer 20 can be of any well known kind that responds to illumination. For example, the printer 20 can have an array of photoconductive elements, such as photocells, photodiodes, or the like, each of which would be aligned with and responsive to illumination from one of the light conducting elements 42. Also, the printer 20 can be of the photoreceptive type incorporating a photosensitive material on a flat or annular surface. If of the latter photoreceptive type, the printing or reproduction can be done by any of the usual reproducing processes, which will, in turn, determine the photosensitive material to be used; for instance, selenium to carry out the xerography process, zinc-oxide for the Electrofax process, or silver halide for the photographic process. Also, ultra-violet light sensitive paper could be used if the panel 10 emits sufficient optical energy in this frequency range of the electromagnetic spectrum.

If an annular surface is preferred, then the printer 20 could utilize, as in FIG. 3, a drum 68. The FIG. 3 embodiment includes an appropriate erasing device 70 which will emit an erasing light that is compatible with the sensitivity of the material on the drum 68 so as to destroy or erase whatever image has been developed by the photosensitive material on the surface of the drum 68. Furthermore by utilizing the drum 68, the process can be continuous and a suitable scanner 72 or the like positioned ahead of the erasing device 70 can read the image on the drum 68 as it passes.

In operation, the panel 10 is first operated by the driving and addressing circuit 40 to generate the Z shaped pattern 16. Next either the turn-off mechanism 54 or the turn-off mechanism 54' is adjusted to start the transfer of illumination. In FIG. 2 the turn-off mechanism 54 moves the print-through device 18 close to the print-out face 14 of the panel 10 and in FIG. 5 the turn-off mechanism 54' aligns the light conducting elements 42 with the cross-points 30. The pattern 14 will then be transferred to the printer 20. If there is a need for light amplification, then the lasing devices 52 can be incorporated in the print-through device 18.

From the foregoing, it will be appreciated that, in accordance with the invention the visual data handling system can be more compact because the print-through device 18 can be in close spaced relation with both the panel 10 and the printer 20. Also the problems with variable contours on the panel's print-out face 14 and the printer 20 is substantially reduced with the print-through device 18. The remote positioning of the printer 20 does not preclude the efficient transfer of light. If intensification is needed, the lasing devices 52 can be used and they will also reduce exposure times.

We claim:

1. In combination, a visual display device having a print-out face and a plurality of spaced illumination generating means which can be selectively operated to provide an illuminated pattern on said print-out face, each illumination generating means being arranged to illuminate a fixed location on said print-out face, print-out means having a surface sensitive to illumination and operative to make a record of an illuminated pattern on said print-out face, print-through means interposed between said print-out face of the visual display device and said illumination sensitive surface of the print-out means for transferring an illuminated pattern from said print-out face to said illumination sensitive surface, said print-through means including a plurality of adjacent elongated light conducting elements, each having an input and an output end and arranged to transfer a portion of the illuminated pattern, the input end of each element being positioned to register with one of said fixed locations on said print-out face to receive the illumination from one of said illumination generating means in said display device representing a portion of a pattern and the output end of each element being positioned to transfer the illumination representing a portion of the pattern to a corresponding location on the illumination sensitive surface of the print-out means, whereby a complete pattern may be transferred from said print-out face to said illumination sensitive surface, and turn-off means for selectively interrupting the transfer of said pattern and adapted to rotate said print-through means about an axis parallel to said elongated light conducting elements between a position where the input ends of all said light conducting elements register with said fixed locations on said print-out face and another position where said input ends of all said light conducting elements are out of register with said fixed locations on said print-out face, whereby the transfer of illumination may be selectively interrupted.

2. The combination as described in claim 1 wherein the light conducting elements each include a fiber optic member and a non-light conducting jacket housing the fiber optic member, the light conducting elements being all in parallel alignment within a matrix of supporting material.

3. A combination as described in claim 1 wherein each light conducting element includes a lasing device arranged therein, the lasing device being operative in response to illumination to the light conducting elements to intensify the illumination.

4. The combination as described in claim 3 wherein the light conducting elements each include a fiber optic member and a non-light conducting jacket housing for the fiber optic member.

5. In combination, a gas discharge panel having a print-out face provided with a plurality of fixed locations selectively energizable so as to become illuminated to present an illuminated pattern of desired information, print-out means having a surface sensitive to illumination and operative to make a record of an illuminated pattern on said print-out face, print-through means interposed between said print-out face and said illumination sensitive surface and including a matrix of coherently arranged light conducting elements, each having an input end thereof positioned to register with one of said fixed locations on said print-out face and an output end thereof positioned adjacent said illumination sensitive surface of the print-out means, so as to transfer the illuminated pattern to the print-out means, the print-through means also including turn-off means for predeterminately alternately interrupting and initiating the transfer of illumination by the print-through means, the turn-off means including means to rotate said print-through means about an axis parallel to said light conducting elements between a position where the input ends of all said light conducting elements register with said fixed locations on said print-out face and another position where said input ends of all said light conducting elements are out of register with said fixed locations on said print-out face, whereby the transfer of illumination may be interrupted.

6. The combination as described in claim 5 wherein the light conducting elements each include a fiber optic member and a non-light conducting jacket housing the fiber optic member, the light conducting elements being all in parallel alignment within a matrix of supporting material.

7. A combination as described in claim 5 wherein each light conducting element includes a lasing device arranged therein, the lasing device being operative in response to illumination to the light conducting elements to intensify the illumination.

8. The combination as described in claim 7 wherein the light conducting elements each include a fiber optic member and a non-light conducting jacket housing for the fiber optic member.

* * * * *